(12) United States Patent
Yang et al.

(10) Patent No.: US 9,374,684 B2
(45) Date of Patent: Jun. 21, 2016

(54) METHOD AND APPARATUS FOR TRANSMITTING CSG INFORMATION

(75) Inventors: Yi Yang, Beijing (CN); Bin Jiao, Beijing (CN)

(73) Assignee: CHINA ACADEMY OF TELECOMMUNCATIONS TECHNOLOGY, Beijing (CN)

( * ) Notice: Subject to any disclaimer, the term of this patent is extended or adjusted under 35 U.S.C. 154(b) by 110 days.

(21) Appl. No.: 14/117,557

(22) PCT Filed: Mar. 23, 2012

(86) PCT No.: PCT/CN2012/072921
§ 371 (c)(1),
(2), (4) Date: Nov. 13, 2013

(87) PCT Pub. No.: WO2012/155681
PCT Pub. Date: Nov. 22, 2012

(65) Prior Publication Data
US 2014/0323135 A1    Oct. 30, 2014

(30) Foreign Application Priority Data

May 17, 2011    (CN) .......................... 2011 1 0127455

(51) Int. Cl.
*H04W 4/06*     (2009.01)
*H04W 40/24*    (2009.01)
(Continued)

(52) U.S. Cl.
CPC ...... *H04W 4/06* (2013.01); *H04W 8/02* (2013.01); *H04W 8/186* (2013.01);
(Continued)

(58) Field of Classification Search
CPC ....... H04W 24/08; H04W 4/02; H04W 64/00; H04W 24/02; H04W 48/16; H04W 4/025; H04W 16/32; H04W 36/0055; H04W 36/0072; H04W 40/24; H04W 40/246; H04W 48/02; H04W 4/06; H04W 36/0033
USPC ........... 455/422.1, 423, 432.1, 439, 440, 449, 455/456.1, 456.5; 370/252, 328, 338
See application file for complete search history.

(56) References Cited

U.S. PATENT DOCUMENTS 9,066,268 B2 * 6/2015 Huang ................. H04W 12/08
2009/0047960 A1  2/2009 Gunnarsson et al.
(Continued)

FOREIGN PATENT DOCUMENTS

CN    101848451 A    9/2010
CN    101888596 A    11/2010
(Continued)

OTHER PUBLICATIONS

International Search Report (in Chinese with English translation) for PCT/CN2012/072921, mailed Jun. 28, 2012; ISA/CN.
(Continued)

*Primary Examiner* — Magdi Elhag
(74) *Attorney, Agent, or Firm* — Harness, Dickey & Pierce, P.L.C.

(57) ABSTRACT

A method and an apparatus for transmitting CSG information are disclosed. In the method, a base station obtains CSG reporting configuration information, determines a CSG information reporting condition is met according to the CSG reporting configuration information, and transmits CSG information of a cell that a UE is located to a mobility management entity.

9 Claims, 6 Drawing Sheets

(51) Int. Cl.
*H04W 48/02* (2009.01)
*H04W 8/02* (2009.01)
*H04W 36/00* (2009.01)
*H04W 88/08* (2009.01)
*H04W 8/18* (2009.01)
H04W 84/04 (2009.01)
H04W 36/06 (2009.01)

(52) U.S. Cl.
CPC ....... *H04W 36/0033* (2013.01); *H04W 40/246* (2013.01); *H04W 48/02* (2013.01); *H04W 88/08* (2013.01); *H04W 36/0061* (2013.01); *H04W 36/06* (2013.01); *H04W 84/045* (2013.01)

(56) References Cited

U.S. PATENT DOCUMENTS

| | | | |
|---|---|---|---|
| 2010/0112980 A1* | 5/2010 | Horn et al. | 455/411 |
| 2010/0240358 A1* | 9/2010 | Jen | H04W 36/385 455/424 |
| 2010/0278147 A1 | 11/2010 | Horn et al. | |
| 2011/0200014 A1* | 8/2011 | Lee et al. | 370/332 |
| 2011/0269465 A1* | 11/2011 | Xu | H04W 36/0033 455/436 |
| 2012/0201206 A1 | 8/2012 | Wang et al. | |
| 2012/0287852 A1* | 11/2012 | Zhou et al. | 370/328 |
| 2014/0248881 A1* | 9/2014 | Xu | H04W 36/0033 455/436 |
| 2016/0057612 A1* | 2/2016 | Xu | H04W 8/186 455/438 |

FOREIGN PATENT DOCUMENTS

| | | |
|---|---|---|
| CN | 101902786 A | 12/2010 |
| CN | 102014362 A | 4/2011 |
| CN | 102026334 A | 4/2011 |
| CN | 102186157 A | 9/2011 |
| EP | 2389032 A1 | 11/2011 |
| EP | 2469924 A1 | 6/2012 |
| WO | 2010081437 A1 | 7/2010 |
| WO | 2011021547 A1 | 2/2011 |

OTHER PUBLICATIONS

Extended European Search Report for Application No. 12785633.4, dated Apr. 1, 2015.
Chinese Office Action for Application No. 2011101274556 dated Feb. 25, 2013, and its English translation thereof.
Chinese Office Action for Application No. 2011101274556 dated Nov. 11, 2013, and its English translation thereof.
Chinese Office Action for Application No. 2011101274556 dated May 22, 2014, and its English translation thereof.

* cited by examiner

METHOD AND APPARATUS FOR TRANSMITTING CSG INFORMATION

PRIORITY STATEMENT

This application is a 371 U.S. National Stage of International Application No. PCT/CN2012/072921, filed on Mar. 23, 2012, and claims the benefit of Chinese Patent Application No. 201110127455.6, entitled "method and apparatus for transmitting CSG information", filed on May 17, 2011, the disclosures of which are incorporated herein in its entirety by reference.

FIELD OF THE DISCLOSURE

The present disclosure relates to telecommunications techniques, and more particularly, to a method and an apparatus for transmitting Closed Subscriber Group (CSG) information.

BACKGROUND OF THE DISCLOSURE

Home Node B/Home evolved Node B (HNB/HeNB) is a kind of small base station with low power, deployed at home and enterprises. It is capable of providing higher speed for users within a relatively small coverage area, and also capable of solving coverage problem in some spots with poor signal propagation for operators.

FIG. 1 shows a network structure of a Long Term Evolution Advance (LTE-A) system after the HeNB is involved. The HeNB may be connected with a core network directly or via a proxy node, Home evolved Node B Gateway (HeNB GW).

It should be noted that, the HNB/HeNB is a base station supporting a CSG function. The CSG function enables a specific subscribed user to access one or more CSG cells which may provide higher access priority and higher service speed for group members. The CSG function can also implement a special charging policy based on the CSG cell. Each CSG cell has a CSG ID, User Equipment (UE) may obtain the CSG ID and a working mode supported by the cell through system information broadcasted via an air interface.

A cell supporting the CSG function may operate in Closed mode or Hybrid mode. A closed CSG cell only allows users who have subscribed to this CSG ID to access. A Hybrid CSG cell allows access of both subscribed users and non-subscribed users. But it may provide higher access priority and higher service speed for subscribed users.

SUMMARY OF THE DISCLOSURE

Examples of the present disclosure provide a method and an apparatus for transmitting CSG information, such that a mobility management entity is capable of acquiring CSG information of a latest cell where a UE is located in time.

According to an example, a method for transmitting CSG information includes:
  obtaining, by a base station, CSG reporting configuration information; and
  determining, by the base station, a CSG information reporting condition is met according to the CSG reporting configuration information, and transmitting CSG information of a cell that a User Equipment (UE) is located to a mobility management entity.

According to another example, a method for transmitting CSG information includes:
  receiving, by a mobility management entity, CSG information of a cell that a User Equipment (UE) is located reported by a base station when the base station determines that a CSG information reporting condition is met according to CSG reporting configuration information.

According to another example, a base station for transmitting CSG information includes:
  an obtaining module, adapted to obtain Closed Subscriber Group (CSG) reporting configuration information;
  a determining module, adapted to determine that a CSG information reporting condition is met according to the CSG reporting configuration information; and
  a transmitting module, adapted to transmit CSG information of a cell that a User Equipment (UE) is located to a mobility management entity.

Compared with existing techniques, the technique of the present disclosure has at least the following advantages: in the case that the base station supports multiple CSG cells, after an inter-CSG cell handover of the UE, the mobility management entity is capable of acquiring the CSG information of the cell where the UE is located in time.

BRIEF DESCRIPTION OF THE DRAWINGS

Figures used in the description of the following examples are briefly introduced herein to make the technical solution of the present disclosure clearer. Features of the present disclosure are illustrated by way of example and not limited in the following figure(s), in which.

DETAILED DESCRIPTION OF THE DISCLOSURE

The inventor finds the following during the implementation of the present disclosure.

Figure 1:
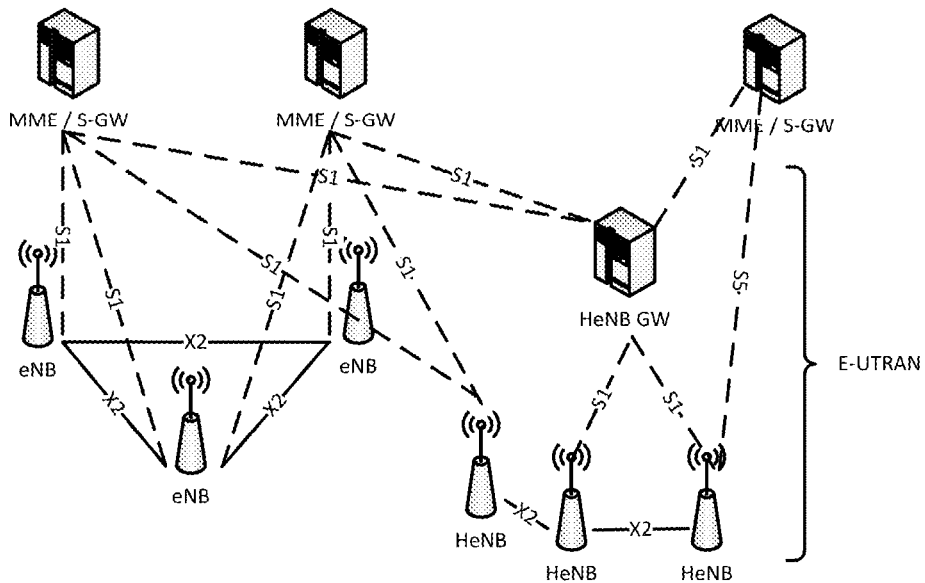
FIG. 1 is a schematic diagram illustrating a network structure of an LTE-A system after HeNB is involved according to existing technique.
Figure 2:
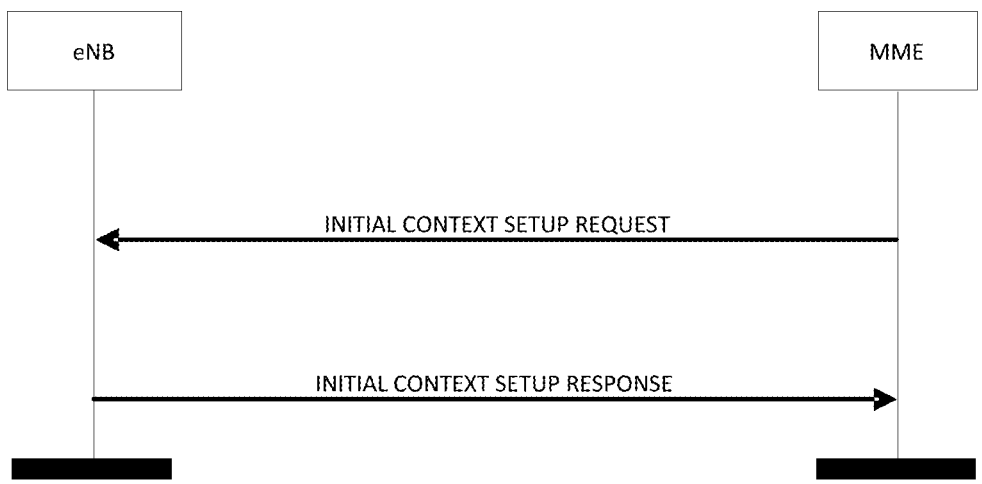
FIG. 2 is a schematic diagram illustrating an initial context setup procedure according to existing technique.

(1) In an initial context setup procedure as shown in FIG. 2, necessary context (including bearing context, security key, handover restricted area, etc.) is set up for a UE in a serving base station of the UE during the initial context setup procedure. When the UE initiates procedures such as attach, service request and tracking area update, the initial context setup procedure between the MME and the base station may be triggered.

Figure 3:
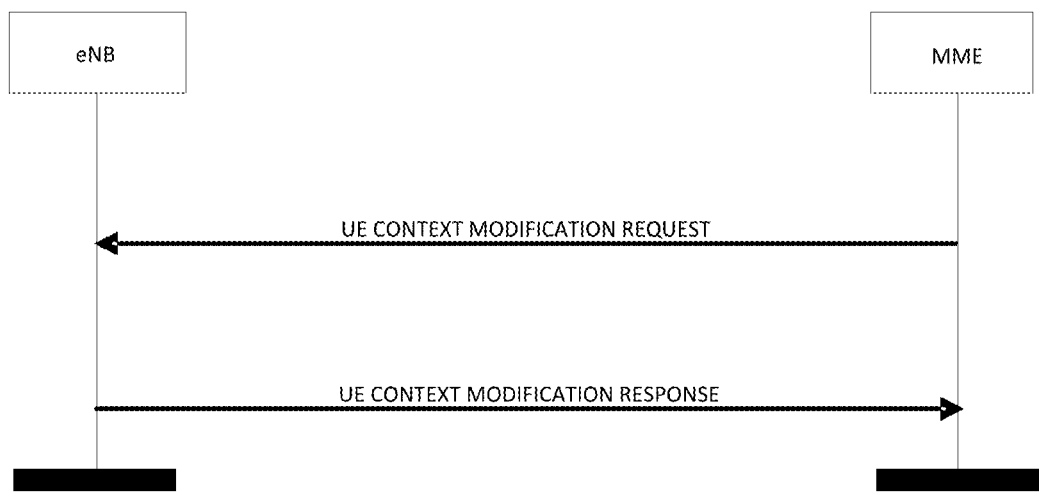
FIG. 3 is a schematic diagram illustrating a UE context modification procedure according to existing technique.

FIG. 3 is a schematic diagram illustrating a UE context modification procedure. The UE context modification procedure is to modify context (including security key, CSG member status, etc.) that has been set up for the UE. When the MME uses a new root key $K_{ASME}$, or the CSG member status of the UE changes, the MME may initiate the UE context modification procedure.

Figure 4:
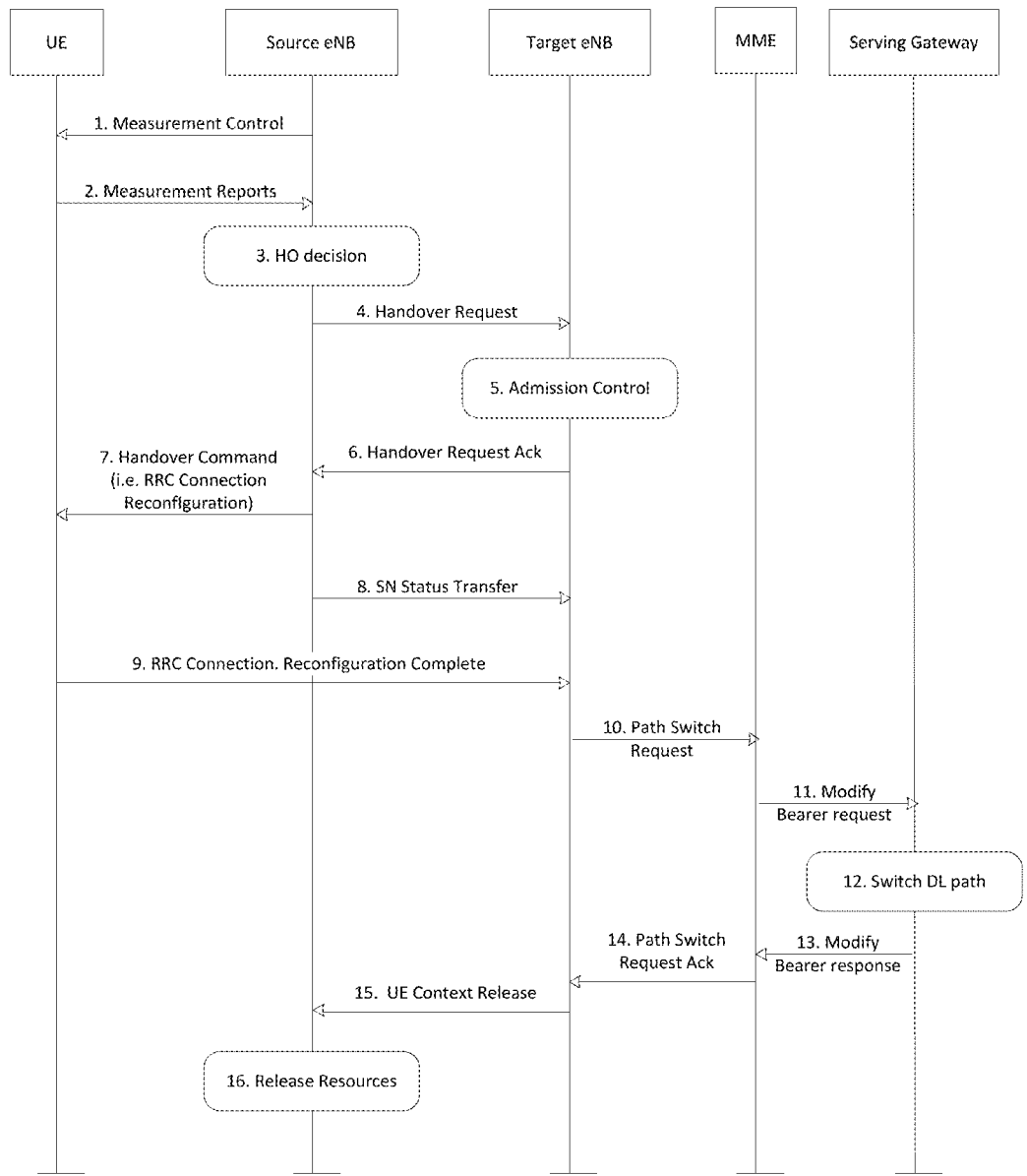
FIG. 4 is a flowchart illustrating an X2 handover of a UE according to existing technique.

(2) FIG. 4 is a schematic diagram illustrating an X2 handover procedure of a UE. A source base station performs a handover decision according to a measurement result of the UE, selects a proper target cell and transmits a handover request message to a target base station. After reserving resources for the UE, the target base station returns an acknowledgement to the source base station, generates a handover command, and transmits the handover command to the UE via the source base station. After receiving the handover command, the UE establishes a Radio Resource Control (RRC) connection with the target base station and returns an RRC connection reconfiguration complete message to the target base station. The target base station transmits a path switch request message to the MME, so as to update location information of the UE and switch a downlink data transmission path. The target base station notifies the source base station to release air resources of the UE.

Figure 5:
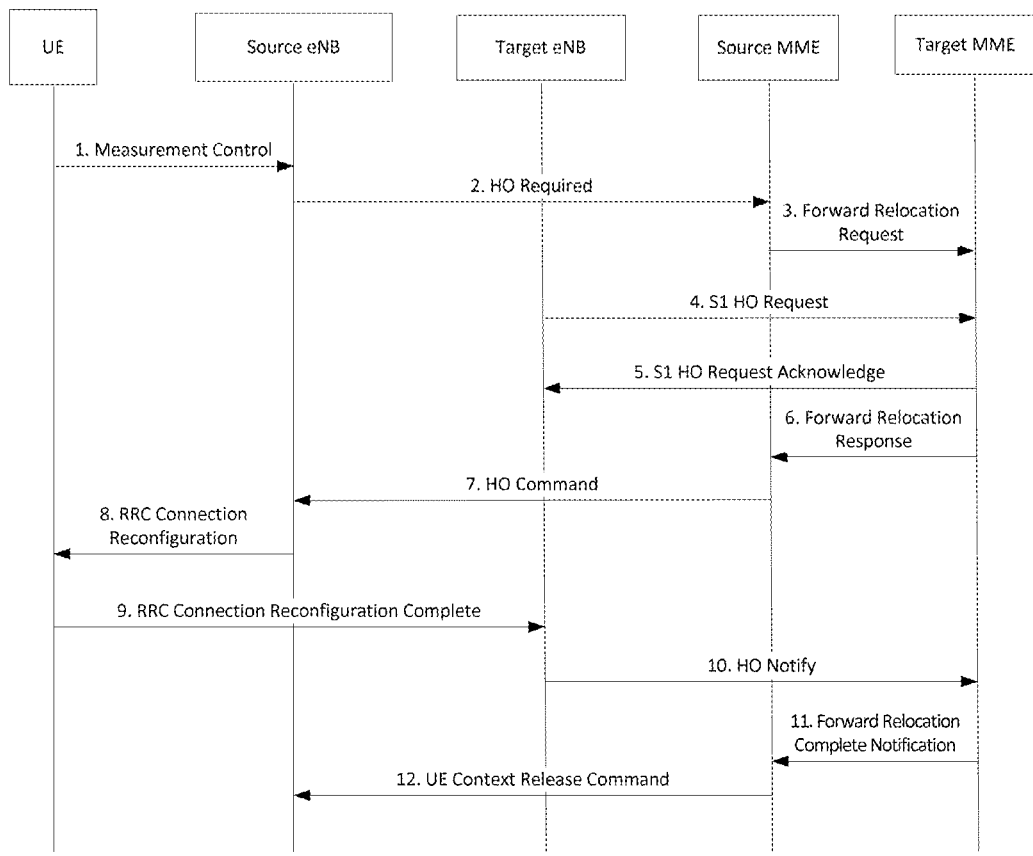
FIG. 5 is a flowchart illustrating an S1 handover of a UE according to existing technique.

FIG. 5 is a schematic diagram illustrating an S1 handover of a UE. A source base station performs a handover decision according to a measurement result of a UE, selects a proper target cell and transmits a handover request message to an MME (i.e., source MME) of the UE. The source MME finds a target MME according to an identifier of the target cell. The target MME transmits a handover request to the target base station. The target base station returns a handover request acknowledgement to the target MME after reserving resources for the UE, generates a handover command, and transmits the handover command to the UE via the source MME and the source base station. After receiving the handover command, the UE establishes an RRC connection with the target cell, and returns an RRC connection reconfiguration complete message to the target base station. The target base station transmits a handover notification message to the MME, so as to update the location information of the UE and switch a downlink data transmission path. The target MME notifies the source side to release resources of the UE.

Figure 6:
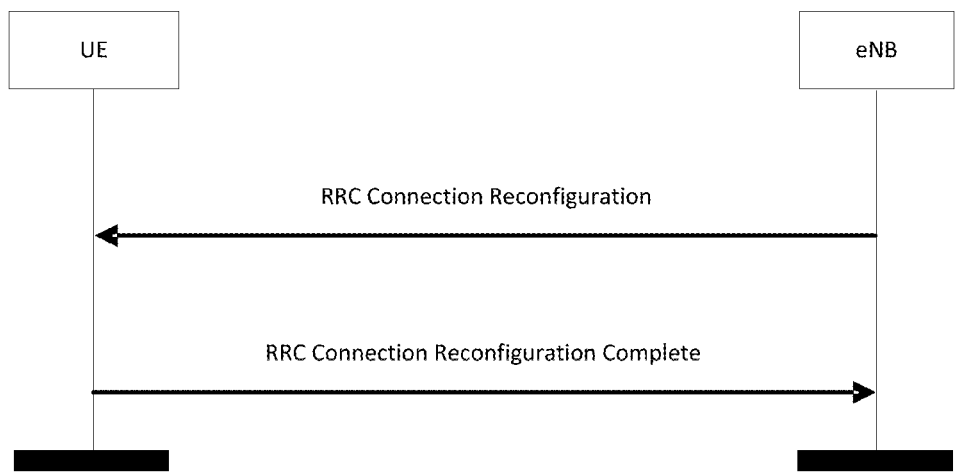
FIG. 6 is a schematic diagram illustrating an intra-eNB handover according to existing technique.

(3) FIG. 6 is a schematic diagram illustrating an intra-eNB handover (intra-base station handover). One base station may support multiple cells. When the UE hands over between different cells of one base station, the base station transmits a RRC Connection Reconfiguration message to the UE. The UE accesses a target cell according to indication information in the RRC Connection Reconfiguration message, and returns an RRC Connection Reconfiguration Complete message to the base station.

It should be noted that, for the intra-eNB handover, after the handover completes, the serving base station of the UE is not required to notify the MME of the UE of the handover.

(4) HNB/HeNB is a type of base station implementing a CSG function. Base stations of other types, e.g., eNB, Relay Node (RN) may also implement the CSG function. The CSG function may provide higher access priority and higher service speed for group members and may also realize a special charging policy based on the CSG cell.

The network side may enable a CSG information reporting function, such that the MME collects the CSG information of a cell where the UE is located and notifies other core network node such as a Packet Data Network Gateway (PGW) of the CSG information.

If the base station supports multiple CSG cells, the UE may hand over between different CSG cells. If the UE hands over between different cells under the same base station, the base station does not report the information of the latest cell where the UE is located to the MME at once. Therefore, if the base station supports multiple CSG IDs, after the UE hands over between CSG cells, the MME cannot acquire the CSG information of the latest cell where the UE is located in time. Therefore, the MME cannot notify the other core network node such as the PGW of the CSG information of the latest cell where the UE is located.

In contrast to this, examples of the present disclosure provide a method and an apparatus for transmitting CSG information. In the case that the base station supports multiple CSG cells, when the UE changes a CSG cell or a CSG member status within one base station, the core network is capable of acquiring the latest CSG information of the UE.

Hereinafter, the present disclosure is described in further detail with reference to the accompanying drawings and examples. What are described and illustrated herein are some examples of the disclosure, but do not form all the examples. Those with ordinary skill may obtain many variations based on the present disclosure without an inventive work, which are within the protection scope of the present disclosure.

Example 1

Figure 7:
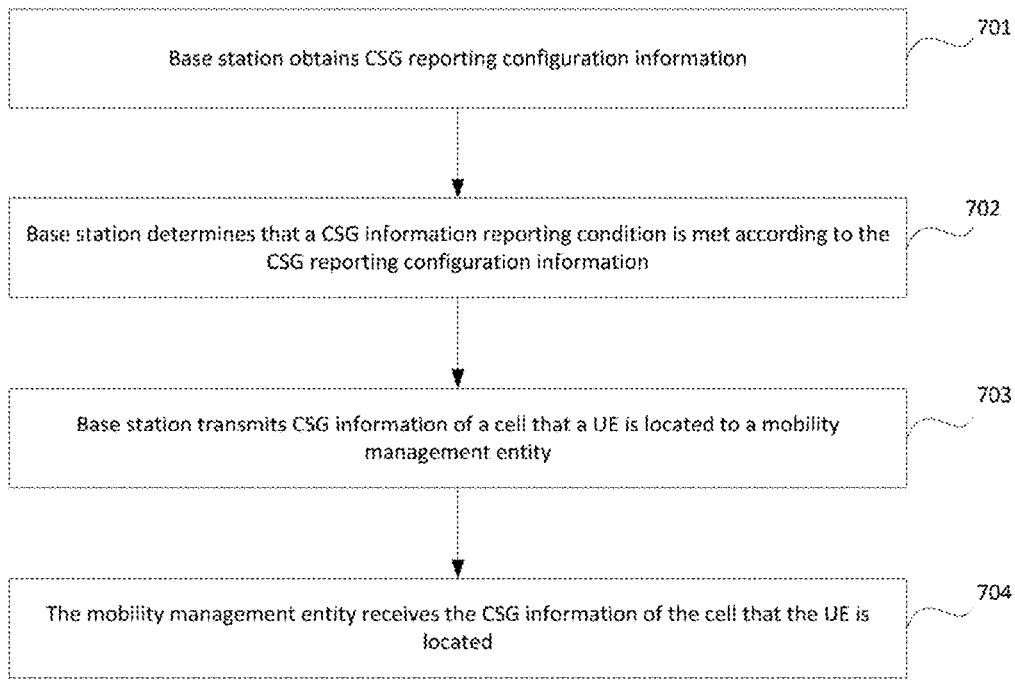
FIG. 7 is a flowchart illustrating a method for transmitting CSG information according to example 1 of the present disclosure.

Example 1 of the present disclosure provides a method for transmitting CSG information. As shown in FIG. 7, the method includes the following.

At block 701, a base station obtains CSG reporting configuration information.

The base station may receive the CSG reporting configuration information from a mobility management entity (such as MME). Or, the base station and a network side may negotiate and determine the CSG reporting configuration information in advance. Or, the base station may obtain the CSG reporting configuration information via other manners. In this example, suppose that the base station receives the CSG reporting configuration information from the mobility management entity. As such, the mobility management entity needs to transmit the CSG reporting configuration information to the base station.

After the network side enables a CSG information reporting function (e.g., the PGW activates a CSG information change notification function), the mobility management entity transmits the CSG reporting configuration information to the base station.

In this example, the mobility management entity may transmit the CSG reporting configuration information to the base station via a existing downlink S1 Application Protocol (S1AP, i.e., an application protocol base on air interface S1) message (including, but is not limited to, initial context setup, UE context modification, path switch request acknowledge, handover request, etc.). Or, the mobility management entity may transmit the CSG reporting configuration information to the base station through a configuration message (i.e., a dedicated configuration message for transmitting the CSG reporting configuration message). The downlink S1 AP message refers to a message that the mobility management entity transmits to the base station.

It should be noted that, with respect to a scenario that the UE hands over between base stations (i.e., a scenario in which serving base station of the UE changes), a serving base station before the UE hands over is a source base station, a serving base station after the UE hands over is a target base station. A procedure that the target base station obtains the CSG reporting configuration information includes: the target base station receives the CSG reporting configuration information from the mobility management entity; or, the target base station receives the CSG reporting configuration information from the source base station, wherein the CSG reporting configuration information is transmitted to the source base station by the mobility management entity before the UE hands over.

Further, the procedure that the mobility management entity transmits the CSG reporting configuration information to the base station includes: after an inter-base station handover of the UE, the mobility management entity transmits the CSG reporting configuration information to the target base station; or, before the inter-base station handover of the UE, the mobility management entity transmits the CSG reporting configuration information to the source base station, such that the source base station transmits the CSG reporting configuration information to the target base station after the inter-base station handover (e.g., through a handover request message).

At block 702, the base station determines that a CSG information reporting condition is met according to the CSG reporting configuration information. The CSG reporting configuration information includes: reporting when CSG ID changes, or, reporting when CSG member status changes, or, reporting at specified time (e.g., immediately).

If the CSG reporting configuration information is reporting when CSG ID changes, when a handover between cells with different CSG IDs happens to the UE (the above base station is the serving base station of the UE), the base station determines that the CSG information reporting condition is met.

If the CSG reporting configuration information is reporting when CSG member status changes, when an inter-CSG cell handover which results in change of member status happens to the UE, the base station determines that the CSG information reporting condition is met.

If the CSG reporting configuration information is reporting at specified time, when the specified time arrives, the base station determines that the CSG information reporting condition is met.

At block 703, the base station transmits the CSG information of the cell where the UE is located to the mobility management entity. The CSG information of the cell includes any one or any combination of: CSG ID, cell mode, and CSG member status.

The base station may transmit the CSG information of the cell where the UE is located to the mobility management entity via an existing uplink S1AP message (e.g., extending an existing Location Report message). Or, the base station may transmit the CSG information of the cell where the UE is located to the mobility management entity through a message for transmitting the CSG information (e.g., a dedicated message configured for the CSG information reporting configuration). The uplink S1AP message refers to a message that the base station transmits to the mobility management entity.

It should be noted that, in the example of the present disclosure, the CSG reporting configuration information may further include stopping reporting. The mobility management entity may determine the CSG reporting configuration information is stopping reporting and transmit the CSG reporting configuration information including stopping reporting to the base station, instructing the base station to stop transmitting the CSG information of the cell where the UE is located to the mobility management entity. Hereinafter, after the base station obtains the CSG reporting configuration information, if the CSG reporting configuration information is stopping reporting, the base station stops transmitting the CSG information of the cell where the UE is located to the mobility management entity.

At block 704, the mobility management entity receives the CSG information of the cell where the UE is located transmitted by the base station. After this block, the mobility management entity may further notify a core network node (e.g., a PGW, etc.) of the CSG information of the cell where the UE is located.

In view of the above, according to the technique provided by the example, in the case that the base station supports multiple CSG cells, after an inter-CSG cell handover the UE, the mobility management entity is capable of acquiring the CSG information of the cell where the UE is located in time.

For example, if the mobility management entity configures the CSG reporting configuration information as "reporting when CSG ID changes", each time a handover between cells with different CSG IDs happens to the UE, the base station will transmit the CSG ID of the new cell where the UE is located to the mobility management entity.

If the mobility management entity configures the CSG reporting configuration information as "reporting when CSG member status changes", each time an inter-CSG cell handover which results in changes of member status happens to the UE, the base station will transmit the current CSG member status of the UE to the mobility management entity. The mobility management entity may further notify the PGW of the CSG member status, so as to implement a function such as charging based on member status.

Example 2

Based on the above example 1, example 2 of the present disclosure provides a method for transmitting CSG information. When the UE enters into a connected state from an idle state, after the PGW activates the CSG information change reporting function (e.g., the PGW activates the CSG information change reporting function during attachment procedure of the UE), the MME configures the CSG reporting configuration information needs to be transmitted to a serving base station of the UE according to a configuration indication of the PGW, and transmits the CSG reporting configuration information to the serving base station of the UE via an initial context setup message.

Preferably, the MME may transmit the CSG reporting configuration information to the serving base station after acquiring that the current serving base station supports the CSG function. For example, when establishing the S1 interface, the MME may receive a message indicating that the serving base station supports the CSG function. Or, the MME may acquire that the serving base station supports the CSG function via an uplink S1AP message (e.g., an initial UE message).

It should be noted that, the serving base station of the UE includes but is not limited to eNB, HNB, HeNB, RN, etc.

Example 3

Based on the above example 1, example 3 of the present disclosure provides a method for transmitting CSG information. When the UE is in a connected state, if the PGW activates a CSG information change reporting function (e.g., the PGW activates the CSG information change reporting function during establishment procedure of dedicated bearer), the MME configures the CSG reporting configuration information according to a configuration indication of the PGW, and transmits the CSG reporting configuration information to a serving base station of the UE via a UE context modification message.

Example 4

Based on the above example 1, example 4 of the present disclosure provides a method for transmitting CSG information. During an X2 handover, if the source base station has initiated a CSG change reporting procedure, the source base station transmits the CSG reporting configuration information to the target base station via a Handover Request message (i.e., the CSG reporting configuration message is added in the Handover Request message in step 4 of FIG. 4). For example, if the CSG reporting configuration information is reporting when CSG information changes, the source base station needs to transmit the CSG reporting configuration information to the target base station. After receiving the CSG reporting configuration information, the target base station performs a corresponding reporting function when a condition is met according to the indication of the CSG reporting configuration information.

Example 5

Based on the above example 1, example 5 of the present disclosure provides a method for transmitting CSG information. During an X2 handover, if the source base station has initiated CSG change reporting procedure, the MME transmits the CSG reporting configuration information to the target base station through a Path Switch Request Acknowledge message (i.e., the CSG reporting configuration information is added into the Path Switch Request Acknowledge in step 14 of FIG. 4). After receiving the CSG reporting configuration information, the target base station performs a corresponding reporting function when a condition is met according to an indication of the CSG reporting configuration information.

It should be noted that, the difference between example 4 and example 5 relies in that, the CSG reporting configuration information in example 4 is transmitted to the target base station by the source base station, whereas the CSG reporting configuration information in example 5 is configured for the base station by the MME.

Example 6

Based on the above example 1, example 6 of the present disclosure provides a method for transmitting CSG information. During an S1 handover, if the source MME carries a CSG information change report indication in a Forward Relocation Request message, a target MME may add CSG reporting configuration information in a Handover Request message (i.e., add the CSG reporting configuration information in the Handover Request message in step 4 of FIG. 5).

Example 7

Based on the above examples 2 to 6, as to the CSG reporting configuration information added in the initial context setup message, UE context modification message, X2 handover request message, path switch request acknowledge message, and S1 handover request message, reference may be made to an implementation of Request Type in this example.

In this example, an existing Location Request Control message may be extended. The Location Reporting Control message realizes reporting configuration for acquiring E-UTRAN Cell Global Identifier (ECGI) and Tracking Area Identifier (TAI) of a cell. Through extending reporting configuration contents, the Location Reporting Control message is able to obtain the CSG information of the cell. The newly added reporting configuration includes: reporting when CSG ID changes, reporting when CSG member status changes, reporting immediately, stopping reporting, etc. The MME may configure one or two items of the above at one time. The Location Reporting Control message transmitted from the MME to the eNB carries a Request Type. The contents of the Request Type includes configurations such as reporting when CSG ID changes, reporting when CSG member status changes, reporting immediately and stopping reporting.

Example 8

Based on the above examples 2 to 6, for CSG reporting configuration information added in the initial context setup message, UE context modification message, X2 handover request message, path switch request acknowledge message, S1 handover request message, reference may be made to an implementation of a Reporting Action in this example.

In this example, in order to realize the CSG information report, an independent configuration procedure may be defined. The CSG reporting configuration information defines an action of the base station. Functions such as reporting when CSG ID changes, reporting when CSG member status changes, reporting immediately, and stopping reporting may be realized. The above functions may be realized through one message or different messages respectively. The MME may configure one or two items of them at one time.

For example, functions including reporting immediately, reporting when CSG ID changes, reporting when CSG member status changes and stopping reporting may be realized by a CSG INFORMATION REPORTING CONTROL procedure. the CSG INFORMATION REPORTING CONTROL message includes an S1AP ID assigned for the UE on interface S1 by the eNB and the MME and includes the CSG reporting configuration information configured by the MME.

If the Reporting Action is configured as "change of CSG ID", after the UE changes the CSG ID (e.g., hands over from a closed CSG cell to another closed CSG cell, or hands over from a closed CSG cell to a Hybrid cell), the base station notifies the MME of the CSG ID of the latest cell where the UE is located. The CSG INFORMATION REPORTING CONTROL message from the MME to the eNB carries the Reporting Action. Contents of the Reporting Action includes configuration such as change of CSG ID, change of CSG member status, immediately, stop.

Example 9

Based on the above example 1, example 9 of the present disclosure provides a method for transmitting CSG information. An existing Location Report message is extended to include CSG ID, cell access mode and CSG member status. If a reporting condition is met, the base station notifies the MME of the CSG information of the current cell of the UE. If the current cell is a Hybrid cell, the reporting message further includes a Cell Access Mode element, indicating that the current cell is a Hybrid cell. The LOCATION REPORT message from the MME to the eNB carries the CSG information such as CSG ID, cell mode and CSG member status.

Example 10

Based on the above example 1, example 10 of the present disclosure provides a method for transmitting CSG information. An independent CSG information reporting procedure is defined. When a reporting condition is met, the base station notifies the MME of the CSG information of the current cell of the UE. The message includes the S1AP assigned for the UE on interface S1 by the eNB and the MME and includes the CSG ID. If the current cell is a Hybrid cell, the message further carries a Cell Access Mode element, indicating that the current cell is a Hybrid cell. The CSG INFORMATION REPORT message from the MME to the eNB includes a Reporting Action.

Example 11

Figure 8:
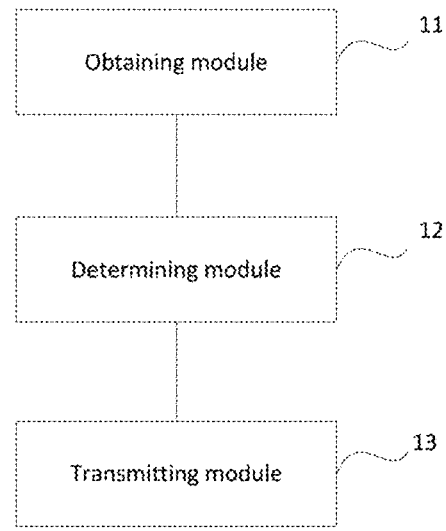
FIG. 8 is a schematic diagram illustrating a structure of a base station according to example 11 of the present disclosure.

Similar to the above method examples, an example of the present disclosure further provides a base station, as shown in FIG. 8. The base station includes:
- an obtaining module 11, adapted to obtain CSG reporting configuration information;
- a determining module 12, adapted to determine that a CSG information reporting condition is met according to the CSG reporting configuration information; and
- a transmitting module 13, adapted to transmit CSG information of a cell that a UE is located to a mobility management entity.

The obtaining module 11 is further adapted to receive the CSG reporting configuration information from the mobility management entity.

After an inter-base station handover of the UE, a serving base station before the handover is a source base station, a serving base station after the handover of the UE is a target base station. If the base station is the target base station, the obtaining module 11 is further adapted to receive the CSG reporting configuration information from the mobility management entity, or receive the CSG reporting configuration information from the source base station, wherein the CSG reporting configuration information is transmitted to the source base station by the mobility management entity before the inter-base station handover of the UE.

If the base station is the source base station, the obtaining module 11 is further adapted to receive the CSG reporting configuration information from the mobility management entity before the inter-base station handover of the UE. The transmitting module 13 is further adapted to transmit the CSG reporting configuration information to the target base station after the inter-base station handover of the UE.

The CSG reporting configuration information includes: reporting when CSG ID changes; or reporting when CSG member status changes; or reporting at a specified time.

The determining module 12 is further adapted to:
- if the CSG reporting configuration information is reporting when CSG ID changes, determine that the CSG information reporting condition is met if a handover between cells with different CSG IDs happens to the UE;
- if the CSG reporting configuration information is reporting when CSG member status changes, determine that the CSG information reporting condition is met when an inter-CSG cell handover happens to the UE; and
- if the CSG reporting configuration information is reporting at a specified time, determine that the CSG information reporting condition is met when the specified time arrives.

The transmitting module 13 is further adapted to transmit the CSG information of the cell where the UE is located to the mobility management entity via an S1AP message.

The CSG information of the cell includes any one or any combination of: CSG ID, cell mode and CSG member status.

The modules in the examples of the present disclosure may be integrated or disposed separately. The above modules may be combined into one module or divided into multiple submodules.

Example 12

Figure 9:
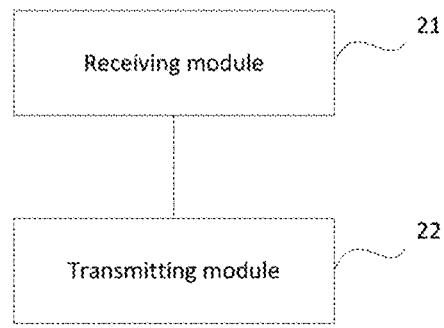
FIG. 9 is a schematic diagram illustrating a structure of a mobility management entity according to example 12 of the present disclosure.

Similar to the above examples, an example of the present disclosure further provides a mobility management entity, as shown in FIG. 9. The mobility management entity includes:
- a receiving module 21, adapted to receive CSG information of a cell that a UE is located reported by a base station when the base station determines that a CSG information reporting condition is met according to CSG reporting configuration information; and
- a transmitting module 22, adapted to transmit the CSG reporting configuration information to the base station.

The transmitting module 22 is further adapted to transmit the CSG reporting configuration information to the base station after a network side enables a CSG information reporting function.

The transmitting module 22 is further adapted to transmit the CSG reporting configuration information to the base station via an S1AP message.

After an inter-base station handover of a UE, a serving base station before the handover of the UE is a source base station, a serving base station after the handover of the UE is a target base station. If the base station is the target base station, the transmitting module 22 is further adapted to
- transmit the CSG reporting configuration information to the target base station after the inter-base station handover of the UE; or
- before the inter-base station handover of the UE, transmit the CSG reporting configuration information to the source base station, such that the source base station transmits the CSG reporting configuration information to the target base station after the inter-base station handover of the UE.

The CSG reporting configuration information includes: reporting when CSG ID changes; or reporting when CSG member status changes; or reporting at a specified time.

The CSG information of the cell includes any one or any combination of: CSG ID, cell mode and CSG member status.

The modules in the examples of the present disclosure may be integrated or disposed separately. The above modules may be combined into one module or divided into multiple submodules.

Example 13

Figure 10:
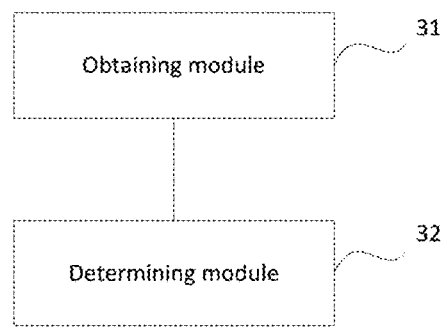
FIG. 10 is a schematic diagram illustrating a structure of a base station according to example 13 of the present disclosure.

Similar to the above examples, example 13 of the present disclosure provides a base station, as shown in FIG. 10. The base station includes:
- an obtaining module 31, adapted to obtain CSG reporting configuration information; and
- a determining module 32, adapted to stop transmitting CSG information of a cell that a UE is located to a mobility management entity if the CSG reporting configuration information is stopping reporting.

The modules in the examples of the present disclosure may be integrated or disposed separately. The above modules may be combined into one module or divided into multiple submodules.

Example 14

Figure 11:
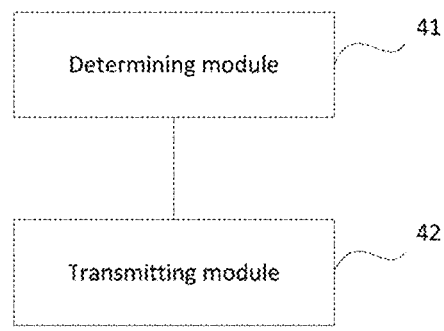
FIG. 11 is a schematic diagram illustrating a structure of a mobility management entity according to example 14 of the present disclosure.

Similar to the above examples, example 14 of the present disclosure provides a mobility management entity, as shown in FIG. 11. The mobility management entity includes:

a determining module 41, adapted to determine CSG reporting configuration information is stopping reporting; and a transmitting module 42, adapted to transmit the CSG reporting information including stopping reporting to a base station, instructing the base station to stop transmitting CSG information of a cell that a UE is located to the mobility management entity.

The modules in the examples of the present disclosure may be integrated or disposed separately. The above modules may be combined into one module or divided into multiple sub-modules.

Through the above descriptions, those with ordinary skill in the art would know that the present disclosure may be implemented in form of software and a necessary hardware platform, or implemented by hardware. But the former is better in most cases. Base on this, the technical solution of the present disclosure or the contribution part may be embodied in form of software product stored on a storage medium. The software product includes a set of instructions executable by a computer (e.g., personal computer, server, or network device) to execute the methods described with reference to each example of the present disclosure.

The drawings merely show some schematic diagrams of examples, not all the modules or blocks in the drawings are necessary for implementing the present disclosure.

It is apparent for those with ordinary skill in the art that, the modules in the apparatus may be disposed in the apparatus according to the description of the examples, or may be disposed in one or more apparatuses after corresponding variation. The modules may be combined into one module or divided into multiple sub-modules.

The serial numbers of the examples are merely used for facilitating the description, but are not intended to denote preference of the examples.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for transmitting Closed Subscriber Group (CSG) information, comprising:
obtaining, by a base station, CSG reporting configuration information; and
determining, by the base station, a CSG information reporting condition is met according to the CSG reporting configuration information, and transmitting CSG information of a cell in which a User Equipment (UE) is located to a mobility management entity, wherein the cell belongs to the base station, the CSG information of the cell comprises any one or any combination of: CSG ID, cell mode, and CSG member status, and wherein the CSG ID is an identifier of the cell and the CSG member status is a membership status of the UE in the cell in which the UE is located;
wherein the CSG reporting configuration information comprises: reporting the CSG information to the mobility management entity when CSG ID changes, or, reporting the CSG information to the mobility management entity when CSG member status changes;
wherein the determining that the CSG information reporting condition is met according to the CSG reporting configuration information comprises:
if the CSG reporting configuration information is reporting when CSG ID changes, determining, by the base station, the CSG information reporting condition is met if a handover between cells with different CSG IDs within the base station happens to the UE; and
if the CSG reporting configuration information is reporting when CSG member status changes, determining, by the base station, the CSG information reporting condition is met if an inter-CSG cell handover within the base station which results in change of a member status happens to the UE.

2. The method of claim 1, wherein the obtaining the CSG reporting configuration information comprises:
receiving, by the base station, the CSG reporting configuration information from the mobility management entity.

3. The method of claim 1, wherein transmitting the CSG information of the cell where the UE is located to the mobility management entity comprises:
transmitting, by the base station, the CSG information of the cell where the UE is located to the mobility management entity via an S1 Application Protocol (S1AP) message.

4. A method for transmitting Closed Subscriber Group (CSG) information, comprising:
receiving, by a mobility management entity, CSG information of a cell that a User Equipment (UE) is located reported by a base station when the base station determines that a CSG information reporting condition is met according to CSG reporting configuration information; wherein the cell belongs to the base station; the CSG information of the cell comprises any one or any combination of: CSG ID, cell mode, and CSG member status; wherein the CSG ID is an identifier of the cell, the CSG member status is a membership status of the UE in the cell in which the UE is located;
wherein the CSG reporting configuration information comprises: reporting the CSG information to the mobility management entity when CSG ID changes, or, reporting the CSG information to the mobility management entity when CSG member status changes;
if the CSG reporting configuration information is reporting when CSG ID changes, determining, by the base station, the CSG information reporting condition is met if a handover between cells with different CSG IDs within the base station happens to the UE; and
if the CSG reporting configuration information is reporting when CSG member status changes, determining, by the base station, the CSG information reporting condition is met if an inter-CSG cell handover within the base station which results in change of a member status happens to the UE.

5. The method of claim 4, further comprising:
before the mobility management entity receives the CSG information, transmitting, by the mobility management entity, the CSG reporting configuration information to the base station.

6. The method of claim 5, wherein the transmitting the CSG reporting configuration information to the base station comprises:
after a network side enables a CSG information reporting function, transmitting, by the mobility management entity, the CSG reporting configuration information to the base station.

7. The method of claim 5, wherein the transmitting the CSG reporting configuration information to the base station comprises:

transmitting, by the mobility management entity, the CSG reporting configuration information to the base station via an S1 Application Protocol (S1AP) message.

8. A base station, comprising:

one or more processors;
   memory; and
   one or more program modules stored in the memory and to be executed by the one or more processors, the one or more program modules including:
   an obtaining module, adapted to obtain Closed Subscriber Group (CSG) reporting configuration information;
   a determining module, adapted to determine that a CSG information reporting condition is met according to the CSG reporting configuration information; and
   a transmitting module, adapted to transmit CSG information of a cell that a User Equipment (UE) is located to a mobility management entity;
   wherein the cell belongs to the base station; the CSG information of the cell comprises any one or any combination of: CSG ID, cell mode, and CSG member status;
   wherein the CSG ID is an identifier of the cell, the CSG member status is a membership status of the UE in the cell in which the UE is currently located;
   wherein the CSG reporting configuration information comprises: reporting the CSG information to the mobility management entity when CSG ID changes, or, reporting the CSG information to the mobility management entity when CSG member status changes;
   the determining module is further adapted to
   if the CSG reporting configuration information is reporting when CSG ID changes, determine the CSG information reporting condition is met if a handover between cells with different CSG IDs within the base station happens to the UE; and
   if the CSG reporting configuration information is reporting when CSG member status changes, determine the CSG information reporting condition is met if an inter-CSG cell handover within the base station which results in change of a member status happens to the UE.

9. The base station of claim 8, wherein the obtaining module is further adapted to receive the CSG reporting configuration information from the mobility management entity.

* * * * *